US011929573B2

(12) United States Patent
Yan et al.

(10) Patent No.: US 11,929,573 B2
(45) Date of Patent: Mar. 12, 2024

(54) THIN SAFETY DOOR

(71) Applicant: Jiangsu General Protecht Co., Ltd., Suzhou (CN)

(72) Inventors: Hua Yan, Suzhou (CN); Bin Chen, Suzhou (CN); Sufeng Cai, Suzhou (CN)

(73) Assignee: JIANGSU GENERAL PROTECHT CO., LTD., Suzhou (CN)

( * ) Notice: Subject to any disclaimer, the term of this patent is extended or adjusted under 35 U.S.C. 154(b) by 87 days.

(21) Appl. No.: 17/641,561

(22) PCT Filed: Sep. 30, 2020

(86) PCT No.: PCT/CN2020/000232
§ 371 (c)(1),
(2) Date: Mar. 9, 2022

(87) PCT Pub. No.: WO2021/093133
PCT Pub. Date: May 20, 2021

(65) Prior Publication Data

US 2022/0336992 A1 Oct. 20, 2022

(30) Foreign Application Priority Data

Nov. 11, 2019 (CN) ......................... 201921937937.6

(51) Int. Cl.
*H01R 13/447* (2006.01)

(52) U.S. Cl.
CPC .................................. *H01R 13/447* (2013.01)

(58) Field of Classification Search
CPC .............. H01R 13/447; H01R 13/4538; H01R 13/4534
See application file for complete search history.

(56) References Cited

U.S. PATENT DOCUMENTS 6,555,771 B2 4/2003 Shao
2015/0037989 A1* 2/2015 Byrne ................ H01R 13/4534
439/137

FOREIGN PATENT DOCUMENTS

| | | |
|---|---|---|
| CN | 201904476 | 7/2011 |
| CN | 102447187 | 5/2012 |
| CN | 107394475 | 11/2017 |
| CN | 209592424 | 11/2019 |
| CN | 210607764 | 5/2020 |

OTHER PUBLICATIONS

CN201904476U English Machine Translation; (Year: 2019).*
International Search Report filed in PCT/CN2020/000232 dated Jan. 6, 2022.

* cited by examiner

*Primary Examiner* — Michael C Zarroli
(74) *Attorney, Agent, or Firm* — Rankin, Hill & Clark LLP

(57) ABSTRACT

A thin safety door includes a baffle, a supporting frame and an elastic element. The baffle is provided with a front slope and a rear slope. The baffle is provided with a pair of sliders disposed side by side at a position between the front slope and rear slope of the baffle. A pair of slide ways are disposed on the left side and right side of the supporting frame. The baffle spans the supporting frame and the sliders are connected to the slide ways, so that the baffle can slide relative to the supporting frame. The elastic element abuts against the baffle, so that an elastic force is applied to the sliders of the baffle for returning to a higher position when located on the slide ways.

3 Claims, 3 Drawing Sheets

THIN SAFETY DOOR

TECHNICAL FIELD

The present invention relates to a safety door structure for protecting power holes to prevent an accidental electric shock.

BACKGROUND

If power holes are exposed, a child can easily get an accidental electric shock when thrusting a conductive object into the power hole, leading to personal injury or property loss.

Therefore, conventional power holes are all provided with safety door structures, such as a supported sliding type safety door provided by an Invention Patent No. CN201010297882.4, which is provided with a slider corresponding to the inside of each pair of holes, wherein the inner side of the slider is provided with a V-shaped supporting shaft which protrudes out of the surface of the inner side, and the V-shaped supporting shaft can slide back and forth on a cover board, so that the slider can block or unblock the holes, playing a safety role.

However, since the V-shaped supporting shaft protrudes out of the surface of the slider and the cover board which cannot be too thin due to stress has to be disposed at the inner side of the slider, the whole structure of the safety door is too thick, leading to the problem of occupying too much space.

SUMMARY

In view of the aforementioned fact, the present invention provides a thin safety door in order to reduce the overall thickness of a safety door structure.

In order to achieve the above-mentioned object, the present invention adopts the following technical solution.

A thin safety door includes a baffle, a supporting frame and an elastic element. The baffle is provided with a front slope and a rear slope which are in the same inclination direction and are separately disposed at the front and the rear of the baffle, in which the lower end of the front slope has no obstruction, and the lower end of the rear slope is open. The supporting frame is provided with a front through hole and a rear through hole which are separately disposed at the front and the rear of the supporting frame and the positions of which respectively correspond to the positions of the front slope and the rear slope. The thin safety door is characterized in that

- the baffle is provided with a pair of sliders disposed side by side at a position between the front slope and rear slope of the baffle;
- a pair of slide ways are disposed on the left side and right side of the supporting frame;
- the baffle spans the supporting frame and the sliders are connected to the slide ways, so that the baffle can slide relative to the supporting frame, and a pair of fulcrums are also formed at the positions where the sliders are in contact with the slide ways, so that the baffle can move like a seesaw on the supporting frame; and
- the elastic element abuts against the baffle, so that an elastic force is applied to the sliders of the baffle for returning to a higher position when located on the slide ways.

According to the thin safety door, the inclination direction of the bottoms of the sliders is opposite from the inclination direction of the front slope.

According to the thin safety door, stop hooks extend downward from the front end of the baffle, the front end of the supporting frame is provided with stop walls, and the stop hooks can interfere with the stop walls of the supporting frame due to the front slope going down, so that the baffle cannot move backward.

According to the thin safety door, a pair of supporting wings are disposed at the rear end of the baffle, the rear end of the supporting frame is provided with a pair of stop notches, and the supporting wings can interfere with the stop notches of the supporting frame due to the front slope going down, so that the baffle cannot move backward.

According to the thin safety door, auxiliary slide ways also extend from the rears of the stop notches, and the supporting wings can slide in the auxiliary slide ways, so that the baffle can steadily slide relative to the supporting frame.

The advantage of the present invention is as follows: compared with the prior art, the thin safety door is thinner, not occupying a height space, so the adaptability of installation of the safety door is increased.

Figure 1:
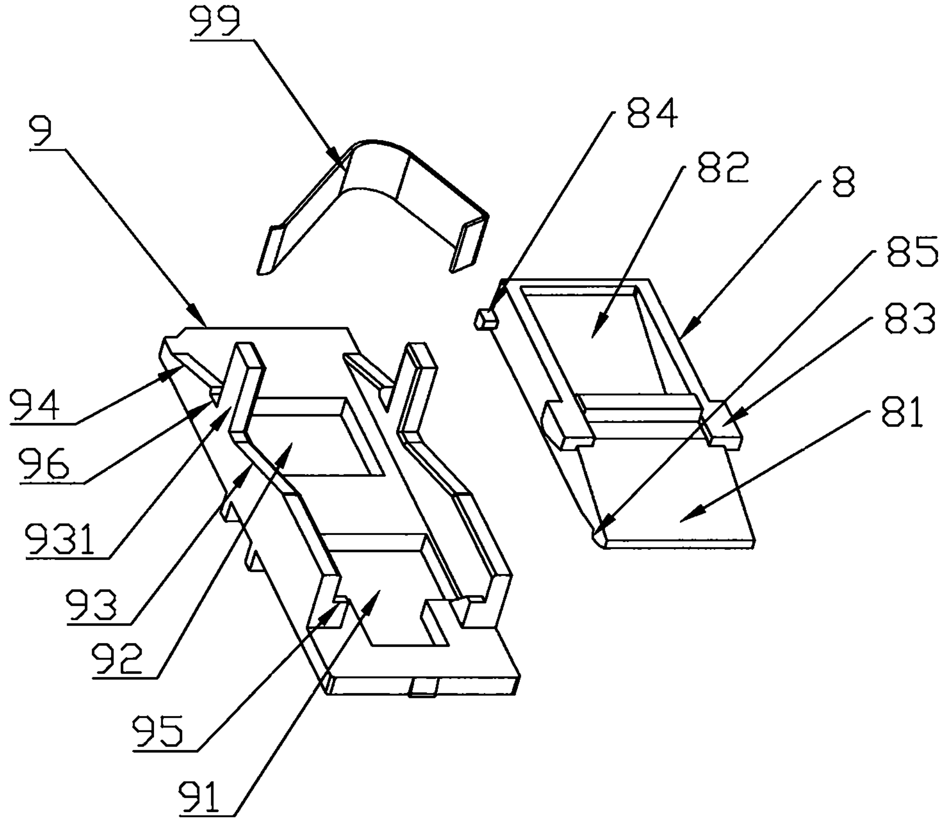
FIG. 1 and FIG. 2 are respectively schematic diagrams of an exploded structure and a combined structure of a safety door.

List of reference numerals: top cover 3; retaining wall 34; baffle 8; front slope 81; rear slope 82; slider 83; supporting wing 84; stop hook 85; supporting frame 9; front through hole 91; rear through hole 92; slide way 93; stop arm 931; auxiliary slide way 94; stop wall 95; stop notch 96; elastic element 99.

DETAILED DESCRIPTION

Some specific embodiments of the present invention will be described in detail blow in an exemplary rather than limiting way with reference to the drawings. In the drawings, the same reference numerals denote the same or similar parts or portions. It should be understood by those skilled in the art that these drawings are not necessarily drawn according to a true scale.

Figure 2:
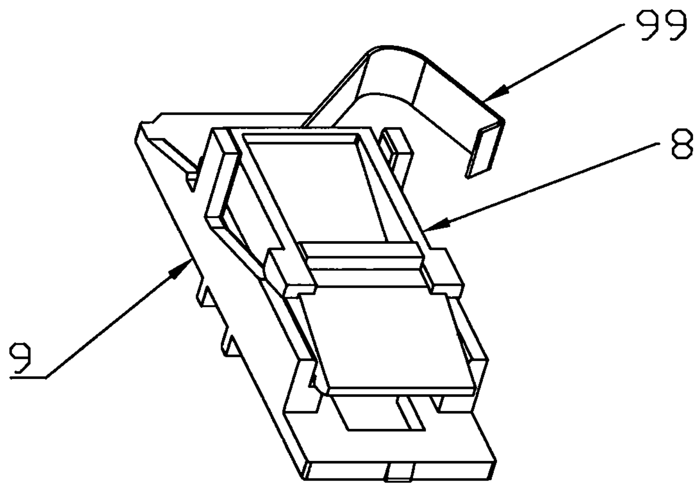

FIG. 1 and FIG. 2 are respectively schematic diagrams of an exploded structure and a combined structure of a thin safety door according to the present invention. The safety door includes a baffle 8 and a supporting frame 9.

The baffle 8 is provided with a front slope 81 and a rear slope 82 which are in the same inclination direction and are separately disposed at the front and the rear of the baffle. The lower end of the front slope 81 has no obstruction and the lower end of the rear slope 82 is open, for the smooth passage through of a positive prong and a negative prong of a plug. Sliders 83 are disposed on the left and right sides of the baffle 8 between the front slope 81 and the rear slope 82. The bottoms of the sliders 83 are preferably slopes with an inclination direction opposite from that of the front slope 81 and the rear slope 82.

The supporting frame 9 is provided with a front through hole 91 and a rear through hole 92 which are separately disposed at the front and the rear of the supporting frame and the positions of which respectively correspond to the positions of the front slope 81 and the rear slope 82. Slide ways 93 with an inclination direction opposite from that of the front slope 81 and the rear slope 82 are separately disposed at the front and the rear and on the left side and right side of the supporting frame 9.

The baffle 8 spans the supporting frame 9 by means of the sliders 83 on both sides thereof. The sliders 83 are coupled to the slide ways 93, so that the baffle 8 can slide relative to the supporting frame 9. A pair of fulcrums are also formed at the positions where the sliders 83 are in contact with the slide ways 93, so that the baffle 8 can move like a seesaw on the supporting frame 9.

The baffle 8 also abuts against an elastic element 99 (e.g., an elastic strip), which can apply an elastic force to the sliders 83 of the baffle 8 located on the slide ways 93 for returning to a higher position.

As shown in FIGS. 1 to 4, the safety door is installed in a top cover 3. The supporting frame 9 is fixed in the top cover 3. The baffle 8 spans the supporting frame 9 and is limited in position. The elastic strip is fixed inside the top cover 3, and abuts against the rear end of the baffle 8, so that the baffle 8 tends to move forward. A retaining wall 34 is disposed in the top cover 3 to define the front limit position of the baffle 8. Stop arms 931 which project upward are disposed at the lower positions of the slide ways 93 to, on one hand, define the lowest position to which the sliders 83 can slide (i.e., define the rear limit position of the baffle 8) and, on the other hand, ensure an enough height space between the supporting frame 9 and the top cover 3, so that the baffle 8 can move in the height space.

Figure 3:
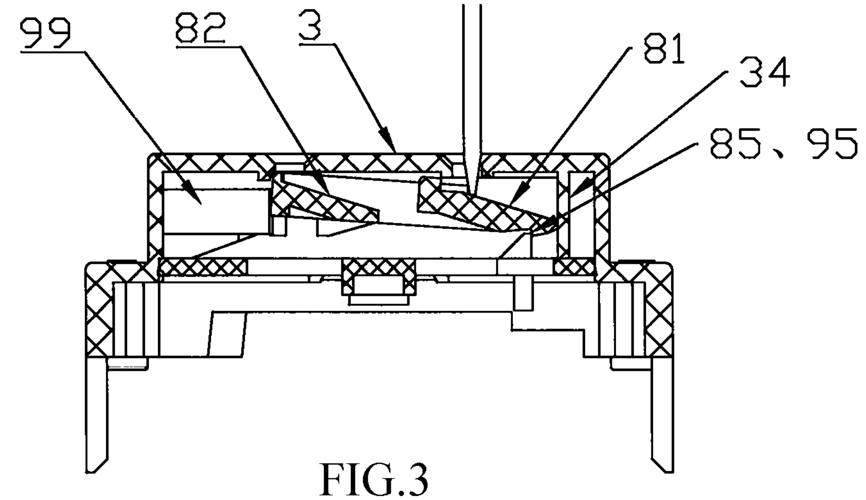
FIG. 3 and FIG. 4 are respectively schematic diagrams showing that the safety door plays a role of safety protection when stabbed by an iron wire.

As shown in FIG. 3, when a baby or child thrusts a conductive object (e.g., an iron wire) into the front power hole, since only the front slope 81 receives pressure, at this moment, the baffle 8 moves like a seesaw, that is, the front slope 81 goes down, while the rear slope 82 goes up. Stop hooks 85 extend downward from the front end of the baffle 8 and the front end of the supporting frame 9 is provided with stop walls 95, so that the stop hooks 85 interfere with the stop walls 95 of the supporting frame 9 due to the front slope 81 going down, and as a result, the baffle 8 cannot move backward, playing a role of safety protection.

Figure 4:
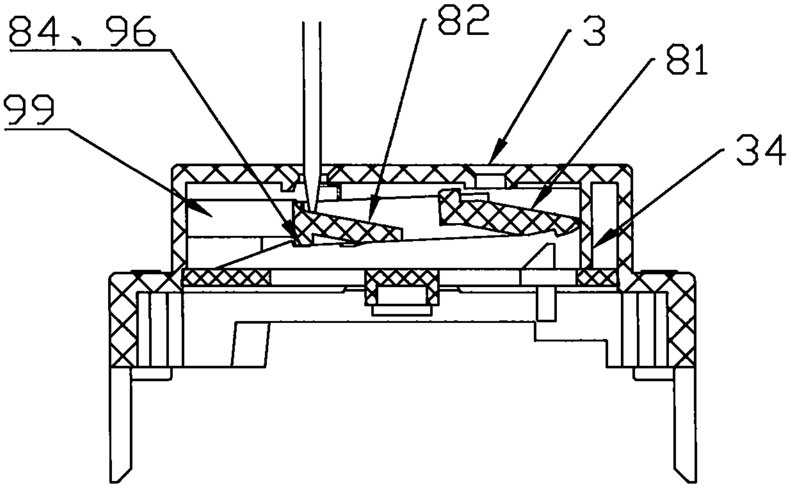

As shown in FIG. 4, when the baby or child thrusts the conductive object (e.g., an iron wire) into the rear power hole, since only the rear slope 82 receives pressure, at this moment, the baffle 8 moves like a seesaw, that is, the rear slope 82 goes down, while the front slope 81 goes up. Both sides of the rear end of the baffle 8 are provided with a pair of supporting wings 84 and the rear end of the supporting frame 9 is provided with stop notches 96, so that the supporting wings 84 interfere with the stop notches 96 of the supporting frame 9 due to the front slope 81 going down, and as a result, the baffle 8 cannot move backward, playing a role of safety protection. In addition, auxiliary slide ways 94 also extend from the rears of the stop notches 96, and the supporting wings 84 can slide in the auxiliary slide ways 94, so that the baffle 8 can steadily slide relative to the supporting frame 9.

Figure 5:
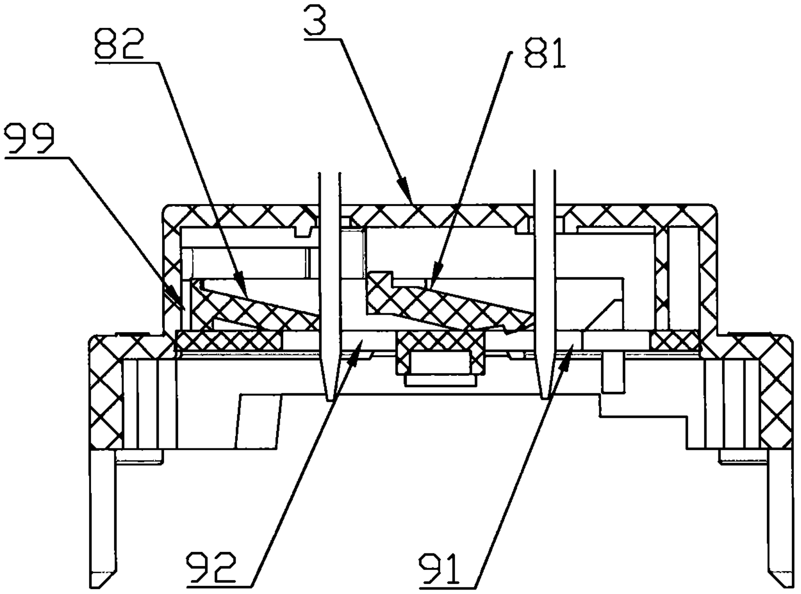
FIG. 5 is a schematic diagram of the action of the safety door when a plug is inserted.

FIG. 5 is a schematic diagram of the action of the safety door when a plug is inserted. Since the front slope 81 and the rear slope 82 simultaneously receive pressure, the seesaw is kept in balance, and the baffle 8 slides relative to the supporting frame 9, so that the plug passes through the front through hole 91 and the rear through hole 92, completing the operation of getting electricity.

The above description is merely illustrative rather than limitative for the present invention, and those of ordinary skill in the art should understand that many modifications, changes or equivalents can be made without departing from the spirit and scope defined by the claims, but shall all fall within the protection scope of the present invention.

The invention claimed is:

1. A thin safety door, comprising a baffle, a supporting frame and an elastic element, the baffle being provided with a front slope and a rear slope which are in the same inclination direction and are separately disposed at the front and the rear of the baffle, with the lower end of the front slope having no obstruction, and the lower end of the rear slope being open; and the supporting frame being provided with a front through hole and a rear through hole which are separately disposed at the front and the rear of the supporting frame and the positions of which respectively correspond to the positions of the front slope and the rear slope, wherein the baffle is provided with a pair of sliders disposed side by side at a position between the front slope and rear slope of the baffle;

a pair of slide ways are disposed on the left side and right side of the supporting frame;

the baffle spans the supporting frame and the sliders are connected to the slide ways, so that the baffle can slide relative to the supporting frame, and a pair of fulcrums are also formed at the positions where the sliders are in contact with the slide ways, so that the baffle can move like a seesaw on the supporting frame; and the elastic element abuts against the baffle, so that an elastic force is applied to the sliders of the baffle for returning to a higher position when located on the slide ways, wherein stop hooks extend downward from the front end of the baffle, the front end of the supporting frame is provided with stop walls, and the stop hooks can interfere with the stop walls of the supporting frame due to the front slope going down, so that the baffle cannot move backward, and wherein a pair of supporting wings are disposed at the rear end of the baffle, the rear end of the supporting frame is provided with a pair of stop notches, and the supporting wings can interfere with the stop notches of the supporting frame due to the rear slope going down, so that the baffle cannot move backward.

2. The thin safety door of claim 1, wherein the inclination direction of the bottoms of the sliders is opposite from the inclination direction of the front slope.

3. The thin safety door of claim 1, wherein auxiliary slide ways also extend from the rears of the stop notches, and the supporting wings can slide in the auxiliary slide ways, so that the baffle can steadily slide relative to the supporting frame.

* * * * *